(12) United States Patent
Fan et al.

(10) Patent No.: US 12,514,259 B2
(45) Date of Patent: Jan. 6, 2026

(54) METHOD FOR KILLING ASPERGILLUS FLAVUS SPORES BY INFRARED RADIATION IN COORDINATION WITH ESSENTIAL OIL FUMIGATION

(71) Applicant: Jiangnan University, Wuxi (CN)

(72) Inventors: Liuping Fan, Wuxi (CN); Mengmeng Ji, Wuxi (CN); Jinwei Li, Wuxi (CN)

(73) Assignee: Jiangnan University, Wuxi (CN)

( * ) Notice: Subject to any disclaimer, the term of this patent is extended or adjusted under 35 U.S.C. 154(b) by 637 days.

(21) Appl. No.: 17/890,308

(22) Filed: Aug. 18, 2022

(65) Prior Publication Data

US 2022/0386636 A1 Dec. 8, 2022

Related U.S. Application Data

(63) Continuation of application No. PCT/CN2021/135346, filed on Dec. 3, 2021.

(30) Foreign Application Priority Data

Apr. 1, 2021 (CN) .......................... 202110355323.2

(51) Int. Cl.
| | |
|---|---|
| A23B 9/04 | (2006.01) |
| A23B 7/01 | (2006.01) |
| A23B 7/144 | (2006.01) |
| A23B 9/18 | (2006.01) |

(52) U.S. Cl.
CPC .................. *A23B 9/04* (2013.01); *A23B 7/01* (2013.01); *A23B 7/144* (2013.01); *A23B 9/18* (2013.01); *A23V 2002/00* (2013.01)

(58) Field of Classification Search
CPC .... A23B 9/04; A23B 9/18; A23B 7/01; A23B 7/144
See application file for complete search history.

(56) References Cited

U.S. PATENT DOCUMENTS

| | | | | |
|---|---|---|---|---|
| 2009/0311392 A1* | 12/2009 | Newman | ................... | A23B 2/40 426/248 |
| 2013/0306158 A1* | 11/2013 | Sardo | ................... | A23B 2/7045 137/455 |
| 2018/0064146 A1* | 3/2018 | Lopez Gomez | ....... | A23B 7/144 |
| 2018/0310556 A1* | 11/2018 | Da Silva Monteiro Bastos | .......... | A23B 9/18 |
| 2020/0221719 A1* | 7/2020 | Sardo | ................... | A01M 17/008 |
| 2020/0281233 A1* | 9/2020 | Bowden | ................... | B65B 9/06 |

FOREIGN PATENT DOCUMENTS

| | | | | | |
|---|---|---|---|---|---|
| CN | 102388958 | A | * | 3/2012 | ............. A23B 7/015 |
| CN | 103783577 | A | | 5/2014 | |
| CN | 103907798 | A | * | 7/2014 | ............... A23L 5/20 |
| CN | 105349239 | A | | 2/2016 | |
| CN | 108522952 | A | * | 9/2018 | ............... A23L 5/20 |
| CN | 112970834 | A | * | 6/2021 | ............. A23B 7/015 |
| CN | 113180179 | A | | 7/2021 | |
| FR | 3052640 | A1 | * | 12/2017 | ............. A23B 7/144 |
| WO | WO-2007092947 | A2 | * | 8/2007 | ............. A23B 2/788 |
| WO | WO-2016151446 | A1 | * | 9/2016 | ............. A23B 7/015 |

OTHER PUBLICATIONS

Wang, Pei "Effective inactivation and degradation of Aspergilllus flavus and aflatoxins in rough rice using pulsed light, ultraviolet and infrared radiation" Doctor dissertation thesis of Jiangsu University. Dec. 31, 2014. p. 73 and p. 77.
Li, hongling et. al. "Effect of essential oils on the growth and aflatoxin production of Aspergillus flavus and Aspergillus Parasiticus" Chinese Journal of Food Hygiene Dec. 31, 2012. V 24 No. 6 p. 591-592.
Aboud et. al. A comprehensive review on infrared heating applications in food processingjournal/MoleculesNov. 15, 2019p. 4125vol. (issue) 24(22)MDPI.
Akhila et. al. Application of electromagnetic radiations for decontamination of fungi and mycotoxins in food products A comprehensive reviewjournal/Trends in Food Science and TechnologyJun. 10, 2021p. 399-409vol. (issue) 114Elsevier Ltd.
Bari et. al. Effectiveness of superheated steam and gas catalytic infrared heat treatments to inactivate *Salmonella* on raw almondsjournal/ Foodborne Pathogens and Disease2010p. 845-850vol. (issue) 7(7)Mary Ann Liebert Inc.
Erdoğdu et. al. Effect of ultraviolet and far infrared radiation on microbial decontamination and quality of cumin seedsjournal/ Journal of Food Science2011p. M284-M292vol. (issue) 76(5)Wiley-Blackwell.
Erdogdu et. al. Experimental determination of penetration depths of various spice commodities (black pepper seeds, paprika powder and oregano leaves) under infrared radiationjournal/Journal of Food EngineeringApr. 9, 2015p. 75-81vol. (issue) 161Elsevier Ltd.
Escalona et. al. UV-C doses to reduce pathogen and spoilage bacterial growth in vitro and in baby spinachjournal/Postharvest Biology and Technology2010p. 223-231vol. (issue) 56(3)Elsevier.
Ferreira et. al. Postharvest UV-C irradiation for fungal control and reduction of mycotoxins in brown, black, and red rice during long-term storagejournal/Food ChemistryAug. 19, 2020p. 127810vol. (issue)339Elsevier Ltd.

(Continued)

*Primary Examiner* — Steven N Leff
(74) *Attorney, Agent, or Firm* — IPro, PLLC; Na Xu

(57) ABSTRACT

The disclosure discloses a method for killing *A. Flavus* spores by infrared radiation in coordination with essential oil fumigation, and belongs to the technical field of sterilization. The method is to treat *A. Flavus* spores by medium and short wave infrared radiation in combination with essential oil fumigation. The disclosure provides a method for killing *A. Flavus* spores by medium and short wave infrared radiation in coordination with essential oil fumigation. On the one hand, air residual heat and energy of medium and short wave infrared radiation are fully used to make a material heated up rapidly, and on the other hand, essential oil on the surface of the material penetrates the cell membrane of *A. Flavus* spores, and further damages protein on the membrane and internal organelles in combination with the heat effect. The process is easy in operation, low in energy consumption, pollution-free and high in sterilization efficiency, and can be used for purifying bulk grains.

11 Claims, No Drawings

(56) References Cited

OTHER PUBLICATIONS

Geveke et. al. UV penetration depth in liquid egg white and liquid whole eggjournal/Journal of Food Processing and Preservation2011p. 754-757vol. (issue)35(6)Wiley-Blackwell.

Ha et. al. Combining Lactic Acid Spray with Near-Infrared Radiation Heating To Inactivate *Salmonella enterica* Serovar Enteritidis on Almond and Pine Nut Kernelsjournal/Appl Environ MicrobiolApr. 24, 20154p. 517-4524vol. (issue) 81American Society for Microbiology.

Hamanaka et. al. Effect of combining infrared heating with ultraviolet irradiation on inactivation of mold sporesjournal/Food science and technology researchMar. 17, 2010p. 279-284vol. (issue) 16(4)Japanese Society for Food Science and Technology.

Kebbi et. al. Recent advances on the application of UV-LED technology for microbial inactivation Progress and mechanismjournal/Comprehensive Reviews in Food Science and Food SafetySep. 16, 2020p. 3501-3527vol. (issue)19(6)Wiley-Blackwell.

Kim et. al. Bactericidal effect of 266 to 279 nm wavelength UVC-LEDs for inactivation of Gram positive and Gram negative foodborne pathogenic bacteria and yeastsjournal/Food research internationalApr. 25, 2017 p. 280-287vol. (issue)97Elsevier Ltd.

Koutchma Status of international regulations for ultraviolet treatment of foodsjournal/IUVA News2018p. 13-16vol. (issue)20(2)International Ultraviolet Association Inc.

Lacivita et. al. Surface UV-C light treatments to prolong the shelf-life of Fiordilatte cheesejournal/Innovative Food Science and Emerging Technologies2016p. 150-155vol. (issue)36Elsevier BV.

Moreno et. al. Short UV-C treatment prevents browning and extends the shelf-life of fresh-cut Carambolajournal/Journal of Food QualityJan. 15, 2017p. 2548791vol. (issue)2017(1)Hindawi Limited.

RastogiRecent trends and developments in infrared heating in food processingjournal/Critical reviews in food science and nutritionJun. 14, 2012p. 737-760vol. (issue)52(9)Taylor and Francis Ltd.

Tyagi et. al. Infrared heating in food processing An overviewjournal/International Journal of Chemical Studies 2020p. 327-336vol. (issue)8(3)AkiNik Publications.

Wang et. al. Effective disinfection of rough rice using infrared radiation heatingjournal/JournalProtection2014v1538-1545vol. (issue)77(9)International Association for Food Protection.

Brock T D. The bacterial nucleus: a history[J]. Microbiological reviews, 1988, 52(4): 397-411.

Greening C, Lithgow T. Formation and function of bacterial organelles[J]. Nature Reviews Microbiology, 2020, 18(12):677-689.

Mo A. The genetics of bacterial spore germination[J]. Annu. Rev. Microbiol, 1990, 44: 531-53.

Dijksterhuis J. Fungal spores: Highly variable and stress-resistant vehicles for distribution and spoilage[J]. Food microbiology, 2019, 81: 2-11.

Escalona V H, Aguayo E, Martínez-Hernández G B, et al. UV-C doses to reduce pathogen and spoilage bacterial growth in vitro and in baby spinach[J]. Postharvest Biology and Technology, 2010, 56(3): 223-231.

Moreno C, Andrade-Cuvi M J, Zaro M J, et al. Short UV-C treatment prevents browning and extends the shelf-life of fresh-cut Carambola[J]. Journal of Food Quality, 2017, 2017(1): 2548791.

Dorbani I, Berberian A, Riedel C, et al. Comparing resistance of bacterial spores and fungal conidia to pulsed light and UVC radiation at a wavelength of 254 nm[J]. Food Microbiology, 2024, 121: 104518.

Coskun E, Ozturk S, Akpinar M, et al. Effect of far infrared heating process on surface decontamination and quality attributes of whole yellow and white onions[J]. Food Control, 2021, 130: 108376.

Smith D L, Atungulu G G, Wilson S A, et al. Deterrence of Aspergillus flavus regrowth and aflatoxin accumulation on shelled corn using infrared heat treatments[J]. Applied Engineering in Agriculture, 2020, 36(2): 151-158.

Jiang J, Zhang Y, Quan J, et al. Effect of far-infrared irradiation on spore and aflation B 1 production of Aspergillus flavus in rice[J]. Food and Machinery, 2018, 34(4): 75-79,220.

Sun Y, Zhao X, Ma Y, et al. Investigation on the microbial diversity of fresh-cut lettuce during processing and storage using high throughput sequencing and their relationship with quality[J]. Foods, 2022, 11(12): 1683.

Li Z, Zhao W, Wang P, et al. Evolution of microbial community and the volatilome of fresh-cut chili pepper during storage under different temperature conditions: Correlation of microbiota and volatile organic compounds[J]. Food Chemistry, 2024, 451: 139401.

Oyedele O A, Kuzamani K Y, Adetunji M C, et al. Bacteriological assessment of tropical retail fresh-cut, ready-to-eat fruits in southwestern Nigeria[J]. Scientific African, 2020, 9: e00505.

Sawai J, Fujisawa M, Kokugan T, et al. Pasteurization of bacterial spores in liquid medium by far-infrared irradiation[J]. Journal of chemical engineering of Japan, 1997, 30(1): 170-172.

Shavandi M, Kashaninejad M, Sadeghi A, et al. Decontamination of Bacillus cereus in cardamom (*Elettaria cardamomum*) seeds by infrared radiation and modeling of microbial inactivation through experimental models[J]. Journal of Food Safety, 2020, 40(1): e12730.

Akhila P. P, Sunooj K V, Aaliya B, et al. Application of electromagnetic radiations for decontamination of fungi and mycotoxins in food products: A comprehensive review[J]. Trends in Food Science and Technology, 2021, 114: 399-409.

Hamanaka D, Uchino T, Furuse N, et al. Effect of the wavelength of infrared heaters on the inactivation of bacterial spores at various water activities[J]. International journal of food microbiology, 2006, 108(2): 281-285.

Wang Y, Li T, Pan Z, et al. Effectiveness of combined catalytic infrared radiation and holding time for decontamination Aspergillus niger on dried shiitake mushrooms (*Lentinus edodes*) with different moisture contents[J]. LWT, 2023, 176: 114503.

\* cited by examiner

METHOD FOR KILLING ASPERGILLUS FLAVUS SPORES BY INFRARED RADIATION IN COORDINATION WITH ESSENTIAL OIL FUMIGATION

TECHNICAL FIELD

The disclosure relates to a method for killing *A. flavus* spores by infrared radiation in coordination with essential oil fumigation, which belongs to the technical field of sterilization.

BACKGROUND

*A. flavus* is a saprophytic fungus commonly found in grains, belongs to Deuteromycetes, and mainly contaminates peanuts, corn, cotton, and other crops and makes them mildewed. Spores carried in the crops will cause re-infection and increase damage in a warm and humid environment if not killed timely and effectively after harvest. Aflatoxin, the secondary metabolite produced during the growth and reproduction of *A. flavus*, is rated as a first-class carcinogen by the International Agency for Research on Cancer and can cause acute toxicity to the human body, target liver cells to cause cancer, induce mutation, suppress immunity, and cause teratogenicity. In the storage and transportation process of grains after harvest, it is usually difficult to control the environmental conditions such as humidity and temperature to completely block the spread of *A. flavus*. On the other hand, aflatoxin has a stable structure, is extremely resistant to high temperature, and only decomposes at the melting point temperature (276-278° C.). Therefore, from decontamination of grains after harvest, killing *A. flavus* spores before toxin production is conducive to reducing the probability of grains being contaminated by toxins from the source and improving the quality of grains.

Traditional drying of grains after harvest is designed to reduce moisture and reduce the possibility of *A. flavus* growth. The commonly used convective drying uses hot air as a heat transfer medium to take away the surface moisture, is energy-consuming, low in heating rate and time-consuming, and often make it difficult to reach the thermal death point of *A. flavus* spores. As a new heating method, infrared radiation is different from the traditional convective drying, and has the characteristics of high heating rate, high heating efficiency and uniform heating. An infrared element radiates infrared rays with a wavelength of 2-15 μm after being heated. In this wavelength range, moisture and protein in a material absorb the infrared rays and convert them into thermal energy, and this is conducive to diffusion of moisture in the drying process, and is suitable for killing microorganisms on the surface of grains. Fumigation is another commonly used decontamination method, and is designed to inhibit vital activities of grains and microorganisms, prevent grains from becoming hot and kill harmful microorganisms. However, most chemical fumigants, such as methyl bromide, are potentially harmful to the human body. Plant essential oils are a kind of secondary metabolite with broad spectrum of bactericidal properties, and have been applied as food preservatives for a long time. Several studies have confirmed that essential oils of clove, pepper, fennel, oregano, peppermint, and other plants can effectively inhibit the growth and aflatoxin production of *A. flavus*. Due to the favorable volatility of plant essential oils, they have favorable application prospects as a green preservative to replace traditional chemical fumigants.

Chinese Patent Application No. 201711298474.9 discloses an invention patent titled: "A method for selectively killing *A. flavus* spores based on planar far-infrared technology", and the patent discloses a method for selectively killing *A. flavus* spores using a planar far-infrared heating plate for heating, including: after the planar heating plate radiated at 115° C. for 5 min, *A. flavus* spores selectively absorb infrared rays at a radiation wavelength of 5-15 μm and are denatured and inactivated, and the number of *A. flavus* spores is decreased by 2.0-2.9 log CFU/g. Then the temperature of the heating plate is decreased to and kept at 70° C. for 15 min, the number of *A. flavus* spores is decreased by 5.5 log CFU/g. After the treatment, the toxin-producing ability of *A. flavus* spores remaining on the surface of rice is controlled, the toxin-production per unit strain is reduced by 20-40%, the total toxin production is reduced by 50-70%, and the sensory quality and nutritional composition of the treated grains are almost unchanged. Grains need not to be humidified in the treatment. For grains with a low moisture content, the moisture content of a material can be reduced to be lower than the safe moisture content of 14% after holding treatment at 65-75° C. for 1-10 h, achieving sterilization and drying simultaneously. However, the disclosure has high infrared energy consumption. The temperature of heating plate needs to be set to 110° C. or above during the radiation, and holding treatment at a low temperature (70° C.) for 15 min is required to achieve the sterilization effect of reducing the number of *A. flavus* spores by 5 log CFU/g and higher.

Chinese Patent Application No. 201811363780.0 discloses an invention patent titled: "Use of star anise extract in preventing and controlling aflatoxin contamination", and when the fumigation concentration of its essential oil is 4.0 μl/g of lotus seeds) and culture is performed at 28±2° C. for 10 d, the growth of mycelia on the lotus seeds is completely suppressed. When the fumigation concentration is 5.0 μl/g of lotus seeds), no aflatoxin is detected on the lotus seeds. Chinese Patent Application No. 201310002615.3 discloses an invention patent titled: "A method for degrading aflatoxin using plant essential oils", 20 g of corn grits infected with *A. flavus* are fumigated with cinnamon essential oil equivalent to 60 mg of cinnamaldehyde, the degradation rate of aflatoxin $B_1$ in the corn grits is 71.75% after fumigation at 28° C. for 28 d, and the degradation rate of aflatoxin $B_1$ in corn grits is 48.39% after fumigation at 38° C. for 14 d. However, due to the unstable nature of essential oils, it is necessary to increase the dose and prolong the fumigation time. The cost is high, the effect is slow, and long-term fumigation has a certain impact on the quality of grains.

SUMMARY

Technical Problem

The actual technical problem to be solved by the disclosure is to provide a method for killing *A. flavus* spores with a decrease in the number of *A. flavus* greater than 3 log CFU/ml spores.

Technical Solution

To solve the above problem, the disclosure provides a method for killing *A. flavus* spores by intermediate-wave infrared radiation in coordination with essential oil fumigation. On the one hand, air residual heat and intermediate-wave infrared radiation are fully used to make a material heat up rapidly, and on the other hand, essential oil on the surface of the material in combination with the heat effect penetrates the cell membrane of *A. flavus* spores, and further damages protein on the membrane and internal organelles. The process is easy in operation, low in energy consumption, pollution-free and high in sterilization efficiency, and can be used for the decontamination of bulk grains.

The first objective of the disclosure is to provide a method for killing *A. flavus* spores by intermediate-wave infrared radiation in combination with essential oil fumigation to treat *A. flavus* spores.

In one implementation of the disclosure, intermediate-wave infrared refers to infrared with a wavelength of 0.7-4 μm.

In one implementation of the disclosure, intermediate-wave infrared radiation is performed at a temperature of 90-120° C. for 5-15 min.

In one implementation of the disclosure, the essential oil used for fumigation is selected from one or more aromatic oils of Lamiaceae plants, and the essential oil fumigation is performed at a dose of 405-1620 mg for 2-8 h.

In one implementation of the disclosure, the method includes: performing essential oil fumigation and intermediate-wave infrared radiation in sequence.

The second objective of the disclosure is to provide a method for preventing aflatoxin contamination in agricultural products, using intermediate-wave infrared radiation in combination with essential oil fumigation to treat the agricultural products, including: fumigating the agricultural products with essential oil first, and then radiating the agricultural products with intermediate-wave infrared to prevent aflatoxin contamination in the agricultural products.

In one implementation of the disclosure, intermediate-wave infrared refers to infrared with a wavelength of 0.7-4 μm; and intermediate-wave infrared radiation is performed at a temperature of 90-120° C. for 5-15 min.

In one implementation of the disclosure, the agricultural products include rice, corn, peanuts, oats or nuts.

In one implementation of the disclosure, the essential oil used for essential oil fumigation is selected from one or more aromatic oils of Lamiaceae plants, and the essential oil fumigation is performed at a dose of 405-1620 mg for 2-8 h.

The third objective of the disclosure is to provide a method for removing *A. flavus* spores from agricultural products, including: fumigating the agricultural products with essential oil first, and then radiating the agricultural products with intermediate-wave infrared to remove *A. flavus* spores from the agricultural products.

In one implementation of the disclosure, the essential oil used for fumigation is selected from one or more aromatic oils of Lamiaceae plants, and the essential oil fumigation is performed at a dose of 405-1620 mg for 2-8 h; intermediate-wave infrared refers to infrared with a wavelength of 0.7-4 μm; and intermediate-wave infrared radiation is performed at a temperature of 90-120° C. for 5-15 min.

In one implementation of the disclosure, the technical solution used in the disclosure includes the following steps:

(1) Essential oil fumigation: Inoculating a solid medium or agricultural products with a suitable concentration of *A. flavus* spore suspension, and placing the solid medium or agricultural products in a 3 L polypropylene plastic fresh-keeping box; the agricultural products including rice, corn, peanuts, oats and nuts; weighing and dropping 405-1620 mg of essential oil on filter paper; placing the filter paper in a glass container without a cover, on one side of the inoculated material; checking the air tightness of the box, and placing the box in a constant temperature incubator at 45° C. to perform fumigation treatment for 2-8 h; and after fumigation, taking out and cooling the material to room temperature for use;

(2) Preheating: Starting an infrared drying oven and setting the temperature in the oven to 90-120° C.;

(3) Infrared radiation: After the measured temperature on a display reaches the preset value and is stable, putting the fumigated material on a tray in the oven, and performing infrared radiation treatment for 5-15 min at a temperature of 90-120° C.; and (4) Cooling: After the sterilization, taking out and cooling the material to room temperature and storing the material.

In one implementation of the disclosure, the content of the main component carvacrol in the essential oil used for fumigation in step (1) is equal to or greater than 88.3% by mass. Carvacrol is an organic compound with a phenolic hydroxyl group, is the main component of aromatic oils of Lamiaceae plants such as oregano essential oil and thyme oil, and is colorless, oily, almost insoluble in water, and easily soluble in organic solvents such as ethanol and methanol. Carvacrol easily penetrates the mycelial cell membrane and destroys its integrity, combines with protein on the membrane, and has a strong inhibitory effect on the growth and metabolism of fungi.

In one implementation of the disclosure, in step (1), the essential oil is not in direct contact with the material inoculated with the *A. flavus* spores.

In one implementation of the disclosure, in step (2), the infrared drying oven is equipped with two kinds of heating tubes with different emission wavelengths on the top. A shortwave heating tube has a radiation wavelength of 0.7-2 μm in a working state, a medium wave heating tube has a radiation wavelength of 2-4 μm, and the power is 450 W and 225 W, respectively. Three heating tubes of each kind are disposed and hang staggered at the top. The infrared absorption range of water is 2.7-3 μm. In the radiation section of intermediate-wave infrared, the radiation energy can be absorbed by the moisture in a material, making the material heat up rapidly and the protein in the spores thermally denatured and inactivated. Intermediate-wave infrared is a range wave, can provide high-intensity, high-density and high-penetration radiant energy, and has a fast heating rate and a short preheating time. It only takes 7-8 min for the temperature in the oven to rise from its normal temperature (20° C.) to its working temperature (120° C.). The heat exchange between the heating tubes and air is balanced and the temperature is kept equal. The sterilization process uses air residual heat and infrared radiation energy, greatly reduces infrared energy consumption, and efficiently killing *A. flavus* spores on the surfaces of a solid medium and agricultural products in a short time.

In one implementation of the disclosure, in step (3), the fumigated material to be sterilized is placed on a loading tray, and the vertical distance between the tray and the top heating tubes is 8-16 cm.

Beneficial Effects of the Disclosure

The method for killing *A. flavus* spores by intermediate-wave infrared radiation in coordination with essential oil fumigation of the disclosure can reduce infrared energy consumption, is suitable for killing *A. flavus* spores in bulk grains, and has the following advantages:

(1) The number of *A. flavus* spores on a solid medium is significantly reduced, and the combined effect is obviously better than the single effect. The number of *A. flavus* spores decreases by 2.59±0.15 log CFU/ml by infrared radiation alone at 100° C. for 5 min. The number of *A. flavus* spores decreases by 0.38±0.08 log CFU/ml by fumigation with 810 mg of essential oil alone for 4 h. By fumigation with 810 mg of essential oil for 4 h in coordination with treatment of infrared radiation at 100° C. for 5 min, the number of *A. flavus* spores decreases by 4.08±0.11 log CFU/ml. By fumigation with 810 mg of essential oil for 4 h in coordination with treatment of infrared radiation at 100° C. for 10 min, the number of *A. flavus* spores decreases by greater than 5.65±0.10 log CFU/ml. By fumigation with 810 mg of essential oil for 4 h in coordination with treatment of infrared radiation at 110° C. for 5 min, the number of *A. flavus* spores decreases by greater than 5.45±0.10 log CFU/ml.

(2) The germination time of *A. flavus* spores on the solid medium treated by the disclosure is 1-3 d longer than that of a control group, and the number of their colonies does not change anymore after 5 d. The residual spores are completely inactivated and cannot be cultured, and the dormancy structure of spores is completely destroyed and cannot be repaired in the culture process, indicating that the *A. flavus* spores on the medium are completely killed by the heat effect of infrared radiation in combination with the penetration effect of the essential oil on the cell membrane.

(3) The disclosure uses infrared radiation in coordination with fumigation treatment, and the essential oil fumigation time is far shorter than the reported time. Essential oils extracted from natural plants are used as fumigants, are non-polluting after application and highly volatile, leave no residue in the system and simple operating conditions, and are suitable for treatment of bulk grains.

(4) The disclosure uses infrared radiation in coordination with fumigation treatment. When combined infrared radiation is performed under the same conditions as infrared radiation alone, the decrease in the number of *A. flavus* spores increased by 1.46 log CFU/ml. To reduce the number of *A. flavus* spores by greater than 5 log CFU/ml, the treatment time of combined infrared radiation is 5 min shorter than that of infrared radiation alone. By coordination, the infrared radiation time is shortened, the air residual heat can be used for heating the material, and the radiation energy consumption is low.

DETAILED DESCRIPTION

The preferred examples of the disclosure will be described below. It should be understood that the examples are for better illustrating the disclosure and are not intended to limit the disclosure.

1. *A. flavus* is from the China General Microbiological Culture Collection Center, has a preservation number of *A. flavus* CGMCC 3.4408, and is disclosed in Jiang Jing, Zhang Yuming, Quan Juncheng, et al. Effects of Far-infrared Radiation on *A. flavus* Spores from Rice and Toxin-producing Ability [J]. Food and Machinery, 2018, v.34; No. 198(04): 81-85+226.

2. Determination method of the number of spores: Refer to GB 4789.15-2016 National Food Safety Standard-Food Microbiological Inspection-Mold and Yeast Counting. An *A. flavus* spore suspension of a suitable dilution gradient is prepared and a Rose Bengal medium is inoculated with the *A. flavus* spore suspension. The *A. flavus* spores are cultured and the number of *A. flavus* colonies is counted.

3. The essential oil used in the following examples and comparative examples is a Lamiaceae plants aromatic oil, namely oregano essential oil, including carvacrol (equal to or greater than 88.3% by mass) and thymol (equal to or greater than 2.5% by mass), and purchased from Jiangxi Xuesong Natural Medicinal Oil Co., Ltd.

EXAMPLE 1

The dish cover of a medium inoculated with an *A. flavus* spore suspension of an appropriate concentration was removed, and the medium was placed in a 3 L polypropylene plastic fresh-keeping box. 810 mg of essential oil was accurately weighed and dropped onto filter paper in the box, and the medium in the box was fumigated for 4 h in a constant temperature incubator at 45° C. An infrared drying oven was set to 100° C. and started heating. After the measured temperature on a display was stable, the dish cover was removed, and the fumigated medium was placed on a tray, radiated for 5 min, and then taken out and cooled to room temperature. After the 5$^{th}$ day of culture, the number of colonies on the medium remained unchanged. Compared with Comparative Example 1, the number of *A. flavus* spores decreased by 4.08±0.11 log CFU/ml, and this is was much higher than the decrease in the number of *A. flavus* spores on the surface of the solid medium in Comparative Example 2 and Comparative Example 3, indicating that the combined treatment of intermediate-wave infrared radiation and essential oil fumigation had a better sterilization effect than single treatment.

Compared with Comparative Example 4, the order of combined treatment had a significant impact on the sterilization effect, and the treatment method of performing fumigation first and then infrared radiation was conducive to the coordination of essential oil and heat to achieve a better sterilization effect.

Compared with Comparative Example 5, the infrared wavelength selected for the combined treatment had a significant impact on the sterilization effect. When a fumigated solid medium was treated by far-infrared, the surface of the medium was heated slowly and the surface temperature was low. But intermediate-wave infrared was conducive to rapid heating of the medium, the surface temperature was high, and the sterilization effect in combination with the fumigation treatment was better.

EXAMPLE 2

The dish cover of a medium inoculated with an *A. flavus* spore suspension of an appropriate concentration was removed, and the medium was placed in a 3 L polypropylene plastic fresh-keeping box. 810 mg of essential oil was accurately weighed and dropped onto filter paper in the box, and the medium in the box was fumigated for 4 h in a constant temperature incubator at 45° C. An infrared drying oven was set to 100° C. and started heating. After the measured temperature on a display was stable, the dish cover was removed, and the fumigated medium was placed on a tray, radiated for 10 min, and then taken out and cooled to room temperature. After the 5$^{th}$ day of culture, the number of colonies on the medium remained unchanged. Compared with Comparative Example 1, the number of *A. flavus* spores decreased by greater than 5.65±0.10 log CFU/ml.

Compared with Example 1, when the infrared radiation temperature was unchanged, the radiation time had a significant impact on the sterilization effect of the combined treatment. Increasing the radiation time increased the surface temperature of the medium and the sterilization effect.

EXAMPLE 3

The dish cover of a medium inoculated with an *A. flavus* spore suspension of an appropriate concentration was removed, and the medium was placed in a 3 L polypropylene plastic fresh-keeping box. 810 mg of essential oil was accurately weighed and dropped onto filter paper in the box, and the medium in the box was fumigated for 4 h in a constant temperature incubator at 45° C. An infrared drying oven was set to 110° C. and started heating. After the measured temperature on a display was stable, the dish cover was removed, and the fumigated medium was placed on a tray, radiated for 5 min, and then taken out and cooled to room temperature. After the 5$^{th}$ day of culture, the number of colonies on the medium remained unchanged. Compared with an untreated group, the number of *A. flavus* spores decreased by 5.45±0.20 log CFU/ml.

Compared with Example 1, when the infrared radiation time was unchanged, the radiation temperature had a significant impact on the combined sterilization effect. Increasing the radiation temperature was conducive to rapid heating of the surface of the medium and increased the sterilization effect significantly.

EXAMPLE 4

The dish cover of a medium inoculated with an *A. flavus* spore suspension of an appropriate concentration was removed, and the medium was placed in a 3 L polypropylene plastic fresh-keeping box. 810 mg of essential oil was accurately weighed and dropped onto filter paper in the box, and the medium in the box was fumigated for 6 h in a constant temperature incubator at 45° C. An infrared drying oven was set to 100° C. and started heating. After the measured temperature on a display was stable, the dish cover was removed, and the fumigated medium was placed on a tray, radiated for 5 min, and then taken out and cooled to room temperature. After the 5th day of culture, the number of colonies on the medium remained unchanged. Compared with Comparative Example 1, the number of *A. flavus* spores decreased by 4.75±0.20 log CFU/ml.

Compared with Example 1, when the infrared radiation conditions were unchanged, the fumigation time had insignificant impact on the combined sterilization effect, and increasing the fumigation time did not significantly improve the sterilization effect.

EXAMPLE 5

A Method for Eliminating *A. Flavus* Spores from Rice

Rice inoculated with an *A. flavus* spore suspension of an appropriate concentration was placed in a 3 L polypropylene plastic fresh-keeping box. 810 mg of essential oil was accurately weighed and dropped onto filter paper in the box, and the rice was fumigated for 4 h in a constant temperature incubator at 45° C. An infrared drying oven was set to 100° C. and started heating. After the measured temperature on a display was stable, the fumigated rice was placed on a tray, radiated for 10 min, and then taken out and cooled to room temperature. The spores were eluted, and after the 5$^{th}$ day of culture, the number of colonies on a medium remained unchanged. Compared with an untreated group, the number of *A. flavus* spores decreased by 3.82±0.20 log CFU/ml.

EXAMPLE 6

A Method for Eliminating *A. Flavus* Spores from Corn

Corn inoculated with an *A. flavus* spore suspension of an appropriate concentration was placed in a 3 L polypropylene plastic fresh-keeping box. 810 mg of essential oil was accurately weighed and dropped onto filter paper in the box, and the corn was fumigated for 4 h in a constant temperature incubator at 45° C. An infrared drying oven was set to 110° C. and started heating. After the measured temperature on a display was stable, the fumigated corn was placed on a tray, radiated for 5 min, and then taken out and cooled to room temperature. After the 5th day of culture, the number of colonies on the medium remained unchanged. Compared with an untreated group, the number of *A. flavus* spores decreased by 4.00±0.20 log CFU/ml.

COMPARATIVE EXAMPLE 1

A solid medium was inoculated with an *A. flavus* spore suspension diluted to an appropriate concentration, the spores germinated after being cultured in a constant temperature and humidity incubator at 28° C. and 70% RH for 1 d, and the number of colonies was counted as 7.35±0.12 log CFU/ml.

COMPARATIVE EXAMPLE 2

Infrared Radiation Alone

*A. flavus* spores on a solid medium were treated with reference to the method of Example 1. The only difference was that infrared radiation was used alone, and other conditions were the same as those of Example 1. The results were shown in Table 1.

COMPARATIVE EXAMPLE 3

Essential Oil Fumigation Alone

*A. flavus* spores on a solid medium were treated with reference to the method of Example 1. The only difference was that essential oil fumigation was used alone, and other conditions were the same as those of Example 1. The results were shown in Table 1.

COMPARATIVE EXAMPLE 4

Infrared Radiation First and then Essential Oil Fumigation

*A. flavus* spores on a solid medium were treated with reference to the method of Example 1. The only difference was that the precedence order of essential oil fumigation and infrared radiation was adjusted, and other conditions were the same as those of Example 1. The results showed that the number of *A. flavus* spores on the surface of the solid medium decreased by 2.40±0.20 log CFU/ml.

COMPARATIVE EXAMPLE 5

Essential Oil Fumigation First and then Far-Infrared Radiation

*A. flavus* spores on a solid medium were treated with reference to the method of Example 1. The only difference was that a far infrared drying oven with a wavelength of 5-15 μm was used for heating, and other conditions were the same as those of Example 1. The results were shown in Table 1.

TABLE 1

Effects of different treatments in killing *A. flavus* spores on a solid medium

| Sample | Treatment method | Surface temperature of material after treatment | Total count reduction/[log CFU/ml or log CFU/g] |
|---|---|---|---|
| Comparative Example 1 | none | 13-16° C. | — |
| Comparative Example 2 | intermediate-wave infrared radiation | 62-65° C. | 2.59 ± 0.15 |
| Comparative Example 3 | Fumigation | 14-15° C. | 0.38 ± 0.08 |
| Comparative Example 4 | (intermediate-wave) infrared radiation first and then fumigation | 32-35° C. | 2.40 ± 0.20 |
| Comparative Example 5 | Fumigation first and then (far) infrared radiation | 57-60° C. | 2.80 ± 0.08 |
| Example 1 | Fumigation first and then (intermediate-wave) infrared radiation | 64-67° C. | 4.08 ± 0.11 |
| Example 2 | Fumigation first and then (intermediate-wave) infrared radiation | 68-71° C. | 5.65 ± 0.10 |
| Example 3 | Fumigation first and then (intermediate-wave) infrared radiation | 65-68° C. | 5.45 ± 0.20 |
| Example 4 | Fumigation first and then (intermediate-wave) infrared radiation | 63-66° C. | 4.75 ± 0.20 |
| Example 5 | Fumigation first and then (intermediate-wave) infrared radiation | 62-65° C. | 3.82 ± 0.20 |
| Example 6 | Fumigation first and then (intermediate-wave) infrared radiation | 61-64° C. | 4.00 ± 0.20 |

Although the disclosure has been provided as above in preferred examples, it is not intended to limit the disclosure. Anyone skilled in the art can make various changes and modifications without departing from the spirit and scope of the disclosure. Therefore, the protection scope of the disclosure should be defined by the claims.

What is claimed is:

1. A method for killing *Aspergillus flavus* (*A. flavus*) spores in rice, corn, peanuts, oats, or nuts, comprising:
    (A) fumigating rice, corn, peanuts, oats, or nuts with 810 mg of essential oil for 4 to 6 hours, wherein the essential oil is an aromatic oil of a labiate plant and comprises at least carvacrol as a main ingredient, and
    (B) radiating the rice, corn, peanuts, oats, or nuts with medium and short wave infrared radiation in sequence,
    wherein the medium and short wave infrared are at a wavelength of 0.7 μm to 2 μm for short wave infrared and 2 μm to 4 μm for medium wave infrared, and at a temperature of 100° C. to 110° C. for 5 to 10 minutes, and
    wherein the method decreases aflatoxin *A. flavus* contamination in the rice, the corn, the peanuts, the oats, and the nuts by 4 log CFU per ml to 5.65 log CFU per ml as compared to rice, corn, peanuts, oats, and nuts that are not subjected to steps (A) and (B).

2. The method of claim 1, wherein the carvacrol amount in the essential oil is equal to or greater than 88.3% by mass of the essential oil.

3. The method of claim 1, wherein the essential oil comprises at least oregano essential oil.

4. A method for preventing aflatoxin contamination in agricultural products, comprising:
    (A) fumigating the agricultural products with 810 mg of essential oil, wherein the essential oil is one or more of aromatic oils of labiate plants, wherein carvacrol is a main ingredient of the essential oil, and wherein the fumigating is performed for 6 hours, and
    (B) radiating the agricultural products with medium and short wave infrared,
    wherein the medium and short wave infrared are at a wavelength of 0.7 μm to 2 μm for short wave infrared and 2 μm to 4 μm for medium wave infrared,
    wherein the radiation is performed at a temperature of 100° C. to 110° C. for 5 to 10 minutes, and
    wherein the method decreases *Aspergillus flavus* contamination in the agricultural products by 4 log CFU per ml to 5.65 log CFU per ml as compared to agricultural products that are not subjected to steps (A) and (B).

5. The method of claim 4, wherein the carvacrol is equal to or greater than 88.3% by mass of the essential oil.

6. The method of claim 4, wherein the agricultural products comprise rice, corn, peanuts, oats or nuts.

7. The method of claim 4, wherein the essential oil comprises at least oregano essential oil.

8. A method for removing *Aspergillus flavus* (*A. flavus*) spores from agricultural products, comprising:
    (A) fumigating the agricultural products with 810 mg of an essential oil selected from one or aromatic oils of labiate plants, and wherein carvacrol is a main ingredient of the essential oil, and wherein the fumigation is performed for 6 hours, and
    (B) radiating the agricultural products with medium and short wave infrared,
    wherein the medium and short wave infrared are at a wavelength of 0.7 μm to 2 μm for short wave infrared and 2 μm to 4 μm for medium wave infrared,
    wherein the medium and short wave infrared radiation is performed at a temperature of 100° C. to 110° C. for 5 to 10 minutes, and
    wherein the method decreases *A. flavus* spores in the agricultural products by 4 log CFU per ml to 5.65 log CFU per ml as compared to agricultural products that are not subjected to steps (A) and (B).

9. The method of claim 8, wherein the carvacrol is equal to or greater than 88.3% by mass of the essential oil.

10. The method of claim 8, wherein the agricultural products comprise rice, corn, peanuts, oats or nuts.

11. The method of claim 8, wherein the essential oil comprises at least oregano essential oil.

* * * * *